Feb. 15, 1927.
C. M. BECKER
1,617,564
METHOD AND APPARATUS FOR MOLDING CONFECTIONS
Filed Feb. 21, 1925    2 Sheets-Sheet 1
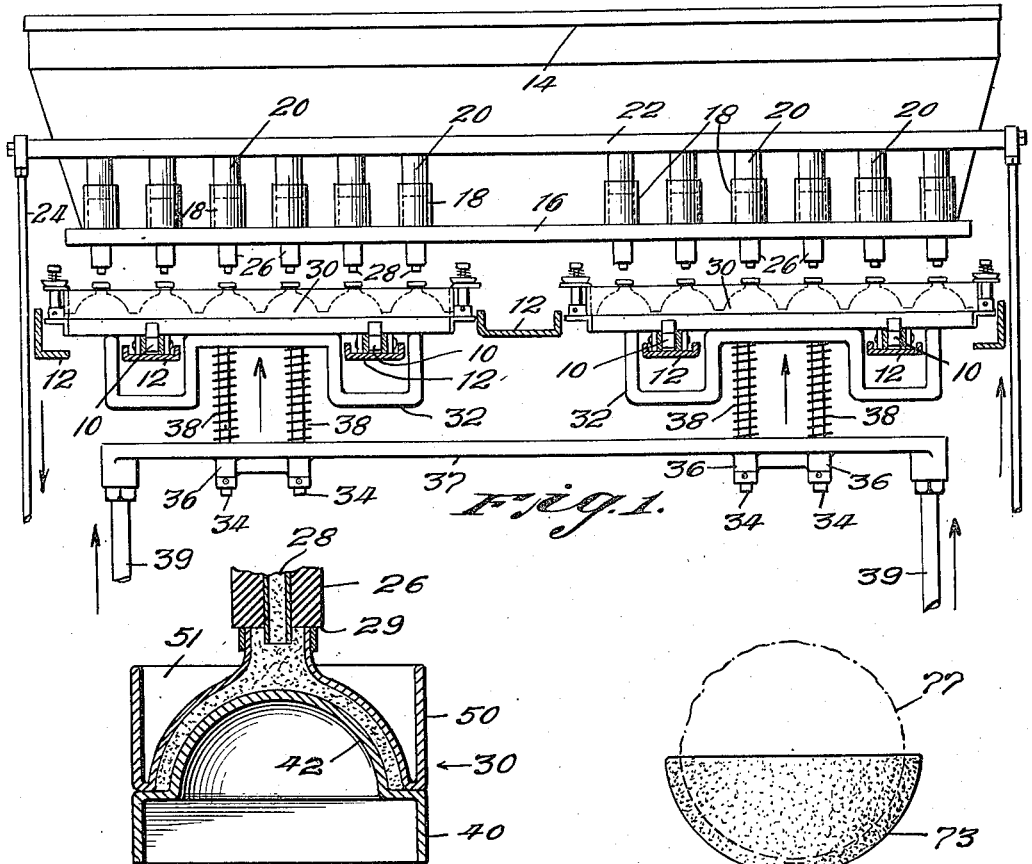
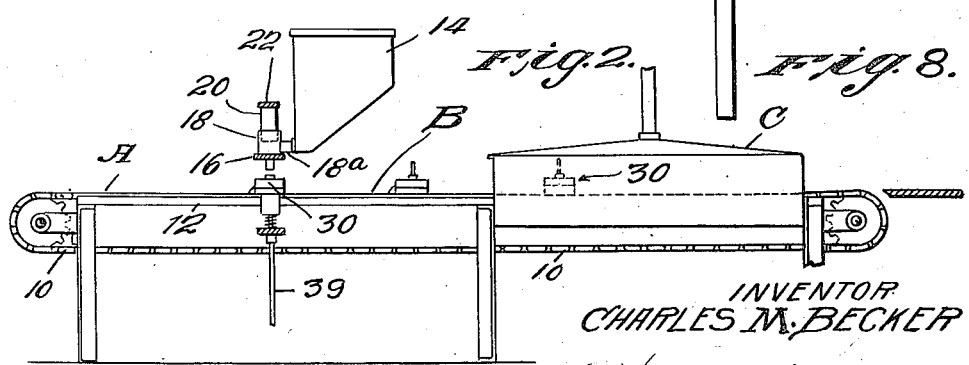
INVENTOR
CHARLES M. BECKER
BY
ATTORNEYS Feb. 15, 1927.

C. M. BECKER 1,617,564

METHOD AND APPARATUS FOR MOLDING CONFECTIONS

Filed Feb. 21, 1925     2 Sheets-Sheet 2

INVENTOR
CHARLES M. BECKER
BY
ATTORNEYS

Patented Feb. 15, 1927.

1,617,564

UNITED STATES PATENT OFFICE.

CHARLES M. BECKER, OF BROOKLYN, NEW YORK, ASSIGNOR TO SMILING CHARLIE, INC., OF NEW YORK, N. Y., A CORPORATION OF DELAWARE.

METHOD AND APPARATUS FOR MOLDING CONFECTIONS.

Application filed February 21, 1925. Serial No. 11,011.

This invention pertains to confectionery, and more especially to molded chocolate.

The herein described apparatus will be found to provide means for producing molded chocolate articles of mechanical properties heretofore unattained, and to produce such chocolate articles at an extremely low cost, with reduced labor and in large quantities.

It is the special purpose of this invention to provide chocolate containers of such strength and malleability as to be capable of resisting strains incidental to their use as cups, ice cream containers and the like, wherein the chocolate structure must not only support the ice cream but must also provide rigid attachment for a handle, by which the whole may be manipulated.

The use of molded chocolate is, of course, well known. However, articles produced by the usual methods of molding, that is to say, by pouring into a mold, have little mechanical strength, are brittle and often porous or contain air bubbles. Attempts have been made to employ such chocolate as a support for ices and the like, but these have failed of their object in that the chocolate was only sufficiently strong to support the ices when used as covering or sheath therefor, this necessitating the user gripping the chocolate covering directly in the fingers. The heat of the fingers melts the surface of the chocolate, discomforting the user and marring the appearance of the confection. This has led to the use of paper, tin foil, or in the case of perhaps the best known of these confections, both paper and tin foil wrapping. Manifestly, when paper and tin foil are used as coverings, the chocolate itself has lost its container function and no longer forms the carrier but merely a part of the filling.

In a chocolate covered confection of the type described herein, it is essential that the user's fingers be kept from contact with the chocolate if the hands are to remain clean and the confection in an edible condition. This is accomplished in the present invention by provision of a projecting handle of non-softening material, by the production of chocolate sufficiently strong to withstand the concentrated strains set up at the point of handle attachment and by the forming of an improved hard, glossy, impervious surface on the chocolate, capable of withstanding a greater degree of heat and moisture than the ordinary chocolate surface.

The method of producing the article, the means therefor, and the improved article produced thereby, are shown in a preferred embodiment in the attached drawings, and various modifications thereof are comprehended within the scope of the appended claims.

Fig. 1 is an elevation of a machine embodying my invention, certain parts being omitted for simplicity of illustration.

Fig. 2 is a diagrammatic side view of the machine.

Fig. 3 is a cross sectional elevation of a part of the mechanism on an enlarged scale.

Fig. 8 is an elevation of an article produced by my improved apparatus and process.

Figure 4:
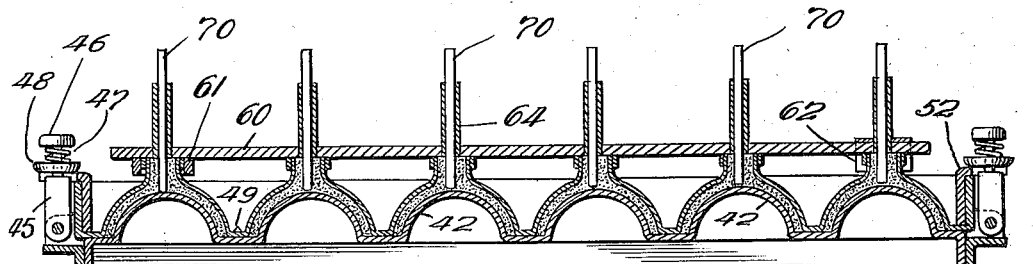
Fig. 4 is a cross sectional elevation of the mold structure.

In the embodiment chosen for illustration, conveyor chains 10 are supported and guided by bed members 12, which also serve, through suitable framework, to support the chocolate magazine or reservoir 14. Magazine 14 supports a cross member 16 holding feed cylinders 18 having pistons or rams 20 actuated by bar 22 operated from suitable mechanism through rods 24. Passage 18ª extends between the trough and molds. The lower ends of cylinders 18 terminate in nozzles 26, having a chocolate tube 28 and a mold engaging or sealing end 29, as shown in Fig. 3.

Molds 30 are placed on the chains 10 near the end A and are borne upon chains 10 which are moved intermittently by any suitable mechanism until brought beneath nozzles 26. They are then lifted against the nozzles by operation of elevators 32, supported by guide rods 34, slidably mounted in bosses 36 of elevator bar 37. Springs 38 surrounding rods 34 serve to press elevators 32, and the molds thereupon, resiliently upward when elevator bar 37 is raised by rods 39.

The mechanism for operation of rods 24 and 39 has been omitted as nonessential to this description. Those skilled in the art will understand that suitable gearing, cams and the like are employed to secure intermittent movement of conveyors 10, elevation of elevators and molds 30, depression of ram bar 22, lowering of elevators and molds, lifting of the rams and further movement of the conveyor to secure positioning of fresh sets of molds below the nozzles, the chains 10 being stationary during the filling operation. It will also be understood that the operation of elevators 32 and the depression of the rams 20 may be interlocked to prevent the forcing of chocolate from the cylinders 18 when the molds 30 are not in charge receiving position.

Figure 5:
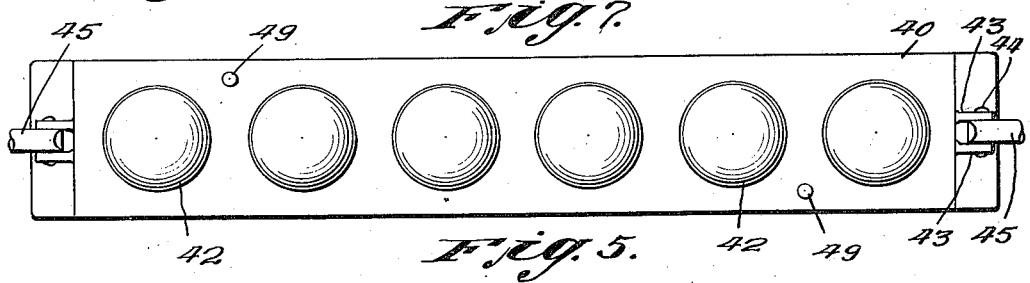
Fig. 5 shows a plan view of the mold base member.
Figure 6:
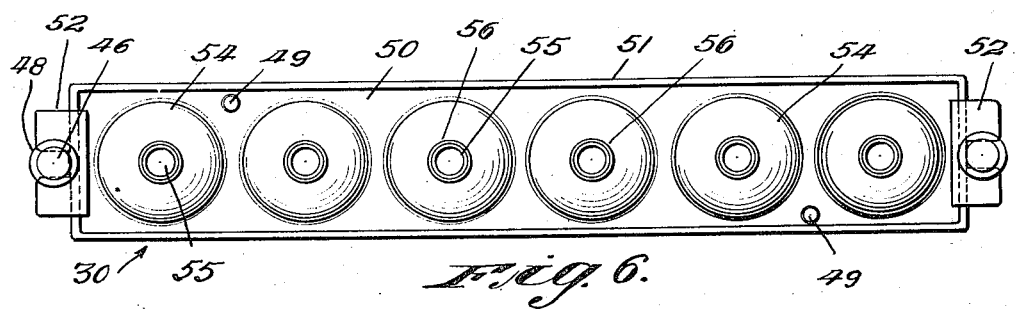
Fig. 6 shows the complete mold structure in plan view.

The construction of molds 30 may be seen in Figs. 3, 4 and 5. The base member 40 bears a series of cores 42 upon its upper surface. At either end, member 40 is provided with brackets 43 supporting pin 44 pivotally engaging clamp studs 45. Clamp studs 45 are headed as at 46 to hold springs 47 bearing downward upon lock disc 48. Member 40 has also two projecting dowels or pins 49 which position the upper mold member, or cope 50.

Upper mold member 50 is formed with a reinforcing rib, or flange, 51, supporting clamp brackets 52 which serve as points of engagement for locking disks 48. Suitable slots in brackets 52 permit clamp studs 45 to stand erect when disks 48 and the brackets are engaged. It will be noted that this clamp construction holds member 50 firmly down upon base member 40. Springs 47 assure solid seating while allowing a certain amount of vertical movement when the pressure in the mold becomes excessive, as will be described. Registry of the mold members is assured since pins 49 are constantly in engagement when the mold is assembled.

Member 50 bears recessed members 54 whose inner surface is of the form desired for the outer surface of the article to be formed. These members are provided with filling openings or gates 55. If desired the mold metal surrounding the gates 55 may be reinforced by a suitable ring 56, the upper surface of which, taken in conjunction with the mold, forms a seat for nozzle 26 when forced into contact therewith.

Rings 56 also serve as an engaging means for bar 60 and friction clamping members 61 and 62. These members co-operate with the rings 56 to secure the bar when placed over the molds after filling and correctly position tubes 64 guiding and supporting the handles 70.

The operation of the device is extremely simple and especially adapted for quantity production. Chocolate is maintained at the desired temperature in magazine 14, the temperature being normally such as to maintain a semi-plastic mass which will chill and not flow by gravity through nozzles 26. Lifting of rams 20 admits a quantity of chocolate through the passages 18ª to each of cylinders 18, from which it is forced through nozzles 26, upon depression of bar 22. The mechanism is so timed that bar 22 is only depressed after molds 30 are positioned by conveyor 10 and pressed upward against the nozzles by elevators 32. When the molds are pressed upward the gates 55 register with, and are sealed to, nozzles 26, as shown in Fig. 3. The rams 20, descending, force the chocolate through passage 28 into the mold. Mold 30 is normally completely closed with the exception of gate 55, now sealed by nozzles 26, thus the pressure within the mold rises as the chocolate enters, and the chocolate is formed under pressure.

The pressure within the mold rises until it overcomes the tension of springs 47, whereupon springs 38 allow the bottom mold member 40 to move downward a very small distance, producing a light opening between the mold members, venting and relieving the air trapped therein so that the chocolate fills the mold.

In the filling of the mold, the chocolate is maintained under a constant pressure until removed from the filling nozzles. This and the venting produces a casting of high mechanical strength, substantially free from blow holes, air bubbles, or other porous or weak spots.

Figure 7:
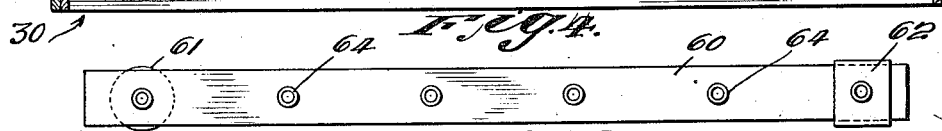
Fig. 7 illustrates in plan view a mold attachment.

This method of filling the mold under pressure assures a chocolate article formed to a uniform density, and a chocolate cup such as may be seen in Fig. 7 at 73, of considerably improved strength can be produced.

The strength of this pressure-molded chocolate is so great, that a simple boss 75 may be molded as part of the cup and forms a secure attachment for the handle 70 of wood or other non-softening material. These handles 70 are placed in a uniform manner by use of bar 60, which is slipped into place at the point B, directly after the molds are released from the nozzles. The handles 70 are pressed downward through tubes 64 until they enter the formed boss 75 the desired distance, and secure bonding of handle and cup results.

A further advantage of the improved apparatus and process is found in the surface imparted to the molded article. The forming surface of the metal of the mold is finished with a high gloss, which partially chills and forms a dense, smooth, polished surface on the molded article and eliminates any need of a coating or lubricant to secure a smooth surface on the casting or to facilitate its removal from the mold or die, and aids the forming of a non-porous cup for ice cream or the like 77. Such a cup will not leak, is of sufficient strength to withstand use, and has an outer surface not liable to smear surrounding objects, although requiring no tin foil or paper wrapping.

After the insertion of the sticks or handles 70 at the point B, the molds are passed through a cooling room C at the end of which they are opened, the cups or other articles removed, and the molds returned to the front end of the machine for passage through the machine again.

It is understood that the particular article shown is but one of many forms within the productive power of the apparatus and process described. The form of this article is particularly adapted for the purposes described but manifestly may be modified for other adaptations. The apparatus and process are also manifestly capable of many modifications in the elements, steps and cooperation of said elements and steps, and all or parts of the apparatus may be used for molding of other materials than chocolate, all within the scope of my invention and the spirit of the appended claims.

Having described my invention, what I claim and desire to secure by Letters Patent is:

1. In a machine for molding dense chocolate articles, a plurality of closed molds provided with filling gates, filling nozzles for said gates, means for conveying said molds beneath said filling nozzles, means for resiliently pressing said molds and gates against said filling nozzle, means for supplying semi-plastic chocolate to said nozzles, means for forcing said chocolate under pressure through said nozzles into said molds, and means for automatically relieving the pressure in said molds when it exceeds a predetermined maximum.

2. In an apparatus for producing hollow containers having smooth, molded interior and exterior surfaces, out of chocolate, a closed, polished mold adapted to form the inner and outer surface of said container, means for forcing viscous chocolate into said mold under pressure and means for automatically venting said mold when the pressure therein exceeds a predetermined maximum.

3. In a chocolate mold, a bottom member, a top member, a plurality of substantially closed molding cavities therein, a filling opening through one of said members into each of said cavities, and spring retaining means normally securing said members together at a plurality of points, said means yielding under excessive pressure within the mold during filling thereof to uniformly vent said molding cavities.

4. In a chocolate pressure mold, an unperforated base member, a gated cope member, positioning means preventing relative movement between said members in one plane and yieldable clamping means controlling movement in a second plane.

5. In a chocolate mold, an unperforated member, a second member provided with a gate engageable with a filling nozzle and filling nozzle sealing means and yieldable clamping means securing said members together to form a normally unvented mold, said clamping means yielding to predetermined pressure within said mold, thereby permitting separation of said members to accomplish venting under pressure.

6. In a positioning attachment for articles inserted in molds of the character described, an article guide member provided with a clamp frictionally engageable with the outer surface of said mold.

7. A handle positioning member for confection molds, comprising a bar, a series of handle guides mounted on said bar and grip means adjacent the ends of said bar, said grip means being engageable with the upper surface of said mold to secure the said bar over the mold and said guides alined over the gates thereof so that handles may be inserted therethrough in the molded article.

8. The process of producing molded chocolate of high density, which comprises maintaining the chocolate in a semi-plastic state, reducing area of flow, and exerting pressures higher than atmospheric to extrude said chocolate from a nozzle into a closed mold, while in said semi-plastic state through said reduced area and maintaining the pressure on said chocolate in said mold until the mold is removed from said nozzle.

9. In a process of producing moisture and heat resistant chocolate cups, the steps which comprise maintaining said chocolate in a semi-plastic state, forcing said chocolate into a defined space to fill said space, and applying further pressure to increase the density of the chocolate in the space.

10. The process of producing pressure molded chocolate articles, which consists of forcing semi-plastic chocolate into a normally unvented mold and relieving pressures above a predetermined maximum in said mold to permit complete filling of said mold under pressure.

11. The process of producing pressure molded chocolate articles, which comprises maintaining said chocolate in a semi-plastic state, applying pressure to said chocolate to force flow, introducing said chocolate into a closed mold and maintaining a predetermined pressure within said mold during filling thereof.

12. In a process of producing chocolate containers secured to foreign bodies, forcing viscous chocolate into a closed mold, maintaining the chocolate under pressure while filling the mold, then forcing the foreign body into the pressure molded chocolate while still in a viscous state, then removing the complete article from the mold.

13. In a process of producing chocolate cup-shaped articles secured to foreign bodies, the steps which consist of maintaining the chocolate in a semi-plastic state, forcing said chocolate in a semi-plastic state into a mold under pressure, then forcing the foreign body into the molded chocolate while still in a semi-plastic state to bond therewith.

14. In a process of producing chocolate cup-shaped articles secured to foreign bodies, the steps which consist of, maintaining the chocolate in a semi-plastic state, forcing said chocolate in a semi-plastic state into a cup-shaped mold under pressure, maintaining the aforesaid pressure until the mold is filled, then forcing the foreign body into the molded chocolate while still in a semi-plastic state to bond therewith.

15. In a process of producing dense cup-shaped articles secured to foreign bodies, the step which consists in maintaining the chocolate in a semi-plastic state forcing said chocolate in said semi-plastic state into a cup-shaped mold under pressure, automatically relieving the pressure in said mold when it exceeds a predetermined maximum to permit the escape of air from the mold, then forcing a foreign body into the mold while still in a semi-plastic state to bond therewith.

16. The process of producing dense, non-porous containers out of chocolate which comprises maintaining the chocolate in a semi-molten condition, forcing said semi-molten chocolate into a closed mold under pressure, venting said mold when the pressure exceeds a predetermined maximum, and maintaining said pressure until the mold is removed from the said forcing means.

17. The process of producing hollow containers, having smooth molded interior and exterior surfaces, out of chocolate, which comprises filling a closed, polished mold adapted to form the inner and outer surface of said container with viscous chocolate, and exerting a superatmospheric pressure on the chocolate in said mold.

In testimony whereof I have affixed my signature to this specification.

CHARLES M. BECKER.